United States Patent [19]

Bishop et al.

[11] 4,369,977
[45] Jan. 25, 1983

[54] SEAL FOR AN OVERSHOT AND A METHOD OF DOING SAME

[75] Inventors: Thomas R. Bishop; Archie W. Peil, both of Houston, Tex.

[73] Assignee: Bowen Tools, Inc., Houston, Tex.

[21] Appl. No.: 211,522

[22] Filed: Dec. 1, 1980

[51] Int. Cl.³ .............................................. F16J 15/32
[52] U.S. Cl. ...................................... 277/1; 277/152; 277/165; 285/110; 166/99
[58] Field of Search ...................... 277/3, 27, 153, 152, 277/1, 165, 30, 31; 285/110, 111, 231, 345; 166/99, 301

[56]  References Cited
U.S. PATENT DOCUMENTS

| | | | |
|---|---|---|---|
| 2,001,684 | 5/1935 | Johnson | 285/110 |
| 2,316,713 | 4/1943 | Procter | 277/153 |
| 2,525,954 | 10/1950 | Schabarum | 166/99 X |
| 3,315,971 | 4/1967 | Sakurada | 285/110 X |
| 3,316,971 | 5/1967 | Brown | 166/99 |
| 3,573,871 | 4/1971 | Warner | 285/110 X |

Primary Examiner—Robert S. Ward, Jr.
Attorney, Agent, or Firm—Pravel, Gambrell, Hewitt, Kirk & Kimball

[57] ABSTRACT

A new and improved seal for an overshot and method for doing same wherein the seal includes a seal ring body mounted with the overshot, the seal ring body having a first and second sealing lip formed therewith and extending inwardly into the bore of the overshot, with the first sealing lip for initially engaging the tubular member to reduce fluid flow therebetween and the second sealing lip, spaced above the first sealing lip, for establishing a fluid-tight relation between the second sealing lip and the tubular member for preventing fluid flow therebetween.

10 Claims, 9 Drawing Figures

SEAL FOR AN OVERSHOT AND A METHOD OF DOING SAME

TECHNICAL FIELD

The field of this invention relates to seals, particularly of the type used for sealing an overshot with a tubular member.

PRIOR ART

Overshots, in the past, have utilized a variety of types of seals in order to overcome sealing problems encountered when an overshot is positioned over a tubular member in downhole retrieval operations and the like. Typical problems encountered have included blowouts of the sealing members due to the high pressures involved typically when circulating fluids such as drilling mud and the like are circulated within the well bore. In the prior art, it has not been uncommon to encounter overshot seals that have become wrinkled and/or twisted because of the high pressure circulation fluids within the well bore coupled with nonaxial alignment of the overshot about the tubular member. Furthermore, overshot seals of the prior art have experienced washout conditions wherein seals have failed in operation.

SUMMARY OF THE INVENTION

The present invention relates to a new and improved seal for an overshot and method of doing same wherein the seal includes an annular seal ring body having first and second sealing lips formed therewith extending radially inwardly into the bore of the overshot from the seal ring body for permitting the first sealing lip to initially engage the tubular member to reduce fluid flow between the overshot and the seal ring body, with the second sealing lip spaced apart and above the first sealing lip for establishing a fluidtight relation between the second sealing lip and the tubular member for preventing fluid flow therebetween.

DESCRIPTION OF THE PREFERRED EMBODIMENT

Figure 1:
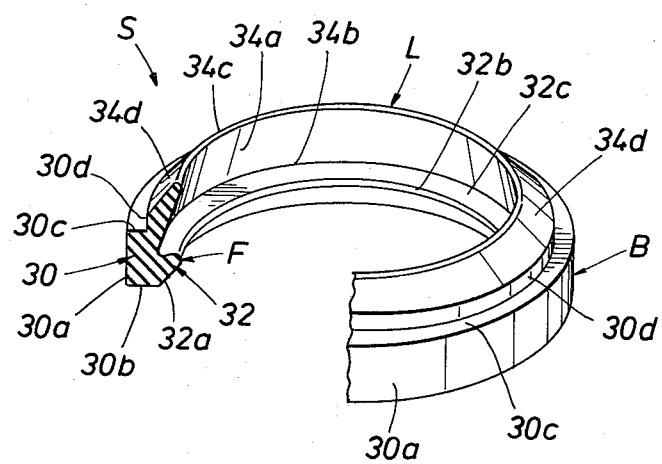
FIG. 1 is an isometric, partly in section, view of the seal of the present invention.

In the drawings, the letter S designates generally the seal of the present invention which is adapted to be used with an overshot O. Generally, the seal S of the present invention includes the seal ring body B, a first sealing lip F and a second sealing lip L as described more fully hereinbelow.

In order to have a better appreciation of the seal S of the present invention, a brief description of the problems encountered in the prior art is constructive. The prior art includes overshots, such as overshot O which includes an overshot body designated generally as 10. The overshot body preferably includes a bore 10a having a sealable conically shaped receiving surface 10b formed adjacent thereto and in axial alignment therewith. The overshot body 10a is typically formed having a radial lip 10c formed adjacent to the bore 10a, an annular surface 10d formed adjacent to radial lip 10c and an upper radial lip 10e formed adjacent to annular surface 10d, with a counter bore 10f formed adjacent to upper radial lip 10e. Preferably, counter bore 10f is of a diameter greater than the bore 10a of the overshot body 10. Furthermore, the overshot body 10 of the overshot O includes a lower end 10g and upper end 10h with the overshot O further including an outer annular surface 10i.

Figure 2:
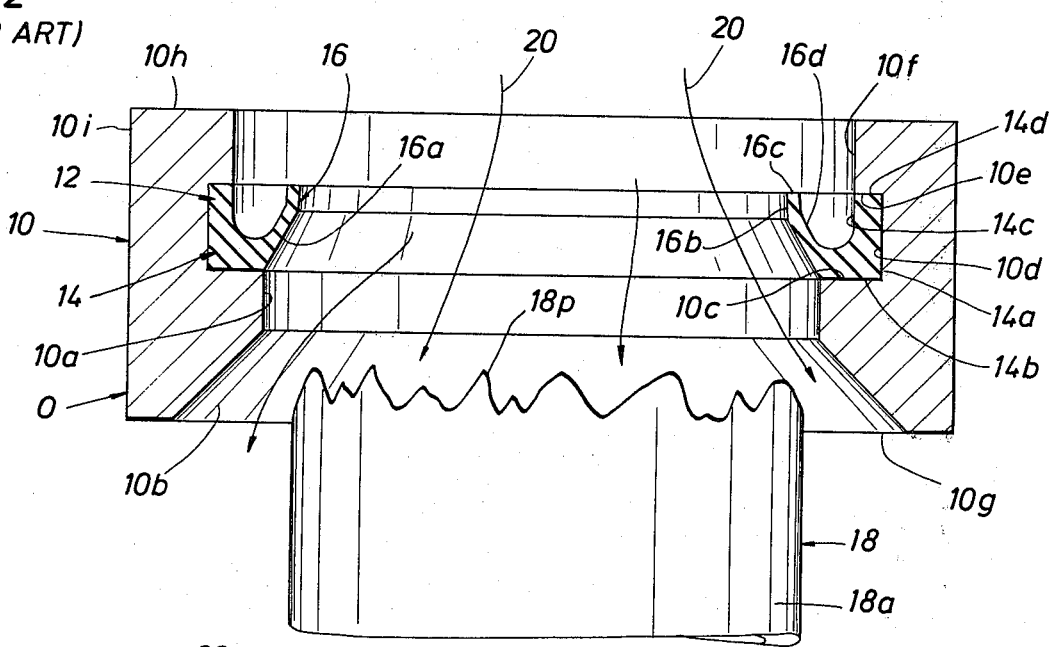
FIG. 2 is an elevational, sectional view of a prior art seal as mounted with an overshot, prior to the overshot engaging the tubular member.

As best seen in FIG. 2, a prior art overshot seal 12 typically includes a seal body designated generally as 14 and a sealing lip 16. Preferably, the seal body 14 of the prior art overshot seal 12 includes an outer annular surface 14a, a lower end surface 14b, an inner bore 14c, and an upper radial surface 14d. The sealing lip 16 of the prior art overshot seal 12 includes a conically shaped, inner sealing surface 16a, an annular surface 16b, an end surface 16c and an outer surface 16 d formed with and adjacent to the seal body 14 of the prior art overshot seal 12.

The overshot O having the prior art overshot seal 12 is adapted to be positioned over a tubular member or fish 18. The tubular member 18 includes an outer annular surface 18a, for which the prior art overshot seal 12 must necessarily engage in a sealable relation to effectuate an attempted fluid-tight relation therebetween during overshot operations O that are well known. Typically such tubular members have broken, sharp end portions, like end portion 18p. As best seen in FIG. 2, typical overshot operations are performed with the circulation of fluids such as depicted by arrows 20. It is not uncommon for such fluid as depicted by the arrows 20 to be under high pressures and of high viscosities, such as in the case if the fluid is drilling mud and the like. Consequently, significant hydrostatic forces are present, which work to the detriment of the prior art overshot seal 12. As shown in FIG. 2, the overshot is positioned above the tubular member 18 prior to engagement of the prior art overshot seal 12 therewith. Circulation of the fluid flows through the inner bore 10c of the seal body 14 and bore 10a of the overshot body 10, and outwardly therefrom through receiving surface 10b and thereabout the tubular member 18. The receiving surface 10b of the overshot body 10 helps to guide the tubular member 18 into the bore 10a of the overshot body 10 of the overshot O as the lower end 10g is positioned adjacent the tubular member 18. It should be understood that the outside diameter of the outer annular surface 18a of the tubular member 18 is typically less than the inside diameter of the bore 10a of the overshot body 10 and inner bore 14c of the seal body 14, but greater than the surface 16b of the sealing lip 16.

Figure 3:
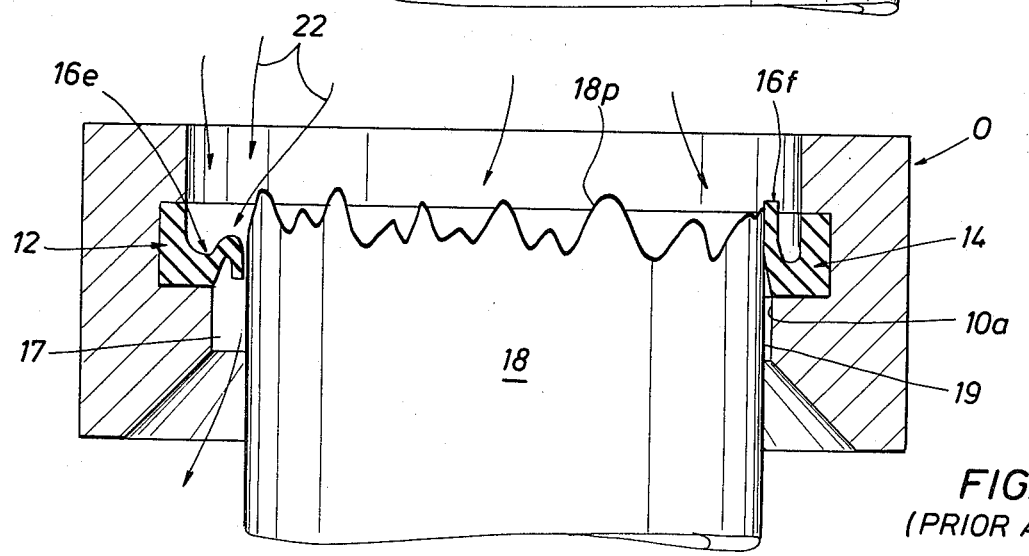
FIG. 3 is an elevational, sectional view of a prior art seal as mounted with an overshot, just as the overshot engages the tubular member.

As the overshot O is lowered about the tubular member 18 as shown in FIG. 3, the tubular member 18 is adapted to fit within the bore 10a of overshot body 10 and inner sealing surface 16a of the sealing lip 16 of the prior art overshot seal 12 as the overshot O is lowered about the tubular member 18. However, due to the fluid pressure, within the tubular members (not shown) that support the overshot O from its upper end 10h, such fluid pressure begins to act upon the prior art overshot seal 12 in the direction of arrows 22 as the pressure concentration begins to localize on one portion of the prior art overshot seal 12 causing an initial deformation of the prior art overshot seal 12 adjacent portion 16e of the sealing lip 16. The fluid buildup causes a "wrinkling" or "waffling" of the inner sealing surface 16a and surface 16b adjacent portion 16d of the sealing lip 16. This may be further aggravated by misalignment or nonalignment of the tubular member 18 within the overshot O, resulting in an annular space 17 between the tubular member 18 and bore 10a adjacent portion 16e, while annular space 19 adjacent portion 16f is significantly smaller. The dimensions and relative proportions of the spaces 17 and 19 have been exaggerated for the purpose of explanation. As shown in FIG. 3, the portion 16f of the sealing lip 16 remains relatively intact while portion 16e experiences the adverse effect of the fluid acting in the direction of arrows 22 which cause a pressure also to build up upon the outer surface 16d of the sealing lip 16 adjacent portion 16e.

Figure 4:
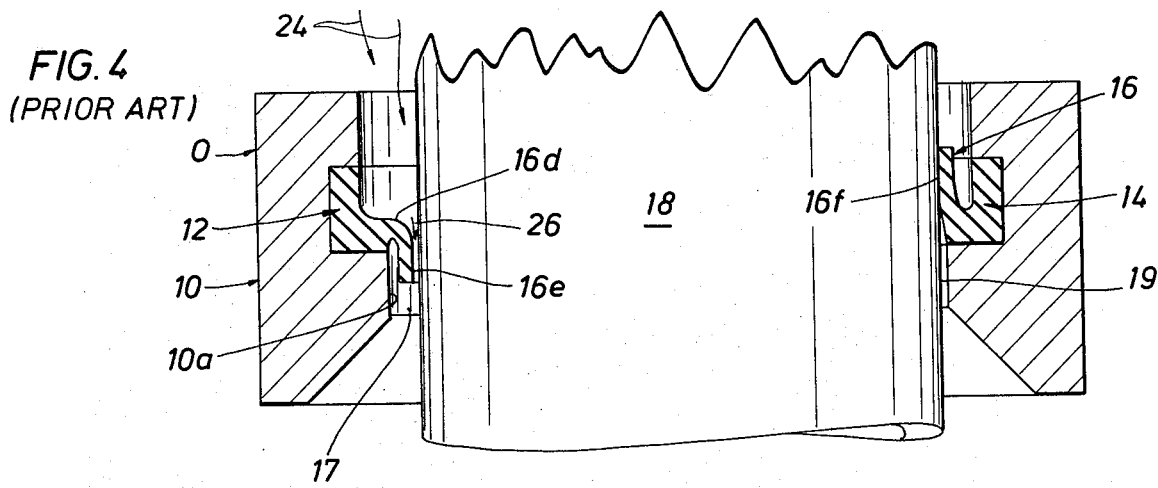
FIG. 4 is an elevational, sectional view of a prior art seal as mounted with an overshot with the overshot positioned about the tubular member and the prior art seal in a failed position.

As best seen in FIG. 4, when the overshot O is completely lowered about the tubular member 18, the fluid pressure acting in the direction of arrows 24 exerts an extreme amount of pressure on the outer surface 16d of prior art seal 12 adjacent portion 16e to cause a failure of the seal 12 in that the outer surface 16d acts against the outer annular surface 18a of the tubular member 18. Furthermore, the buckling or curling of the prior art seal 12 adjacent portion 16e results in potential leakage in the direction of arrow 26 while the tubular member 18 is misaligned within the bore 10a of the overshot body 10 of the overshot O. As a result, portion 16f of the sealing lip 16 is in a proper engaging position against the outer annular surface 18a of the tubular member, but the portion 16e is irreparably damaged and does not establish a fluid-tight relation between the prior art overshot seal 12 and the tubular member 18, thus allowing the escape of fluid, such as drilling mud and the like, therebetween, thus destroying the fluidtight relation that is necessary between the overshot O and tubular member 18.

As best seen in FIGS. 1, 5-9, the seal S of the present invention for the overshot O includes generally a seal ring body B, a first sealing lip F and a second sealing lip L. The seal ring body B of the seal S of the present invention includes ring body 30 which includes an outer annular surface 30a, a base end surface 30b, and a top end surface 30c, such that the outer annular surface 30a is adapted to engage annular surface 10d of overshot body 10, and base end surface 30b engages radial lip 10c and top end surface 30c is in engagement with upper radial lip 10e for a suitable mounting of the seal S with the overshot O. Preferably, the base end surface 30b and top end surface 30c are substantially parallel with one another while the outer annular surface 30a is substantially perpendicular to base and top end surfaces 30b, 30c. Furthermore, the ring body 30 includes annular surface 30d which is adapted to be in engagement with counterbore 10f the overshot body 10 and is substantially perpendicular to top end surface 30c.

The seal S of the present invention further includes a first sealing lip F which includes first lip designated generally as 32 and includes a first conical sealing surface 32a, an annular tip surface 32b and a second conical sealing surface 32c. Preferably, the first conical sealing surface 32a extends radially inwardly and upwardly from the base end surface 30b and adjoins the second conical sealing surface 32c at the radially innermost portion at annular tip surface 32b.

Figure 5:
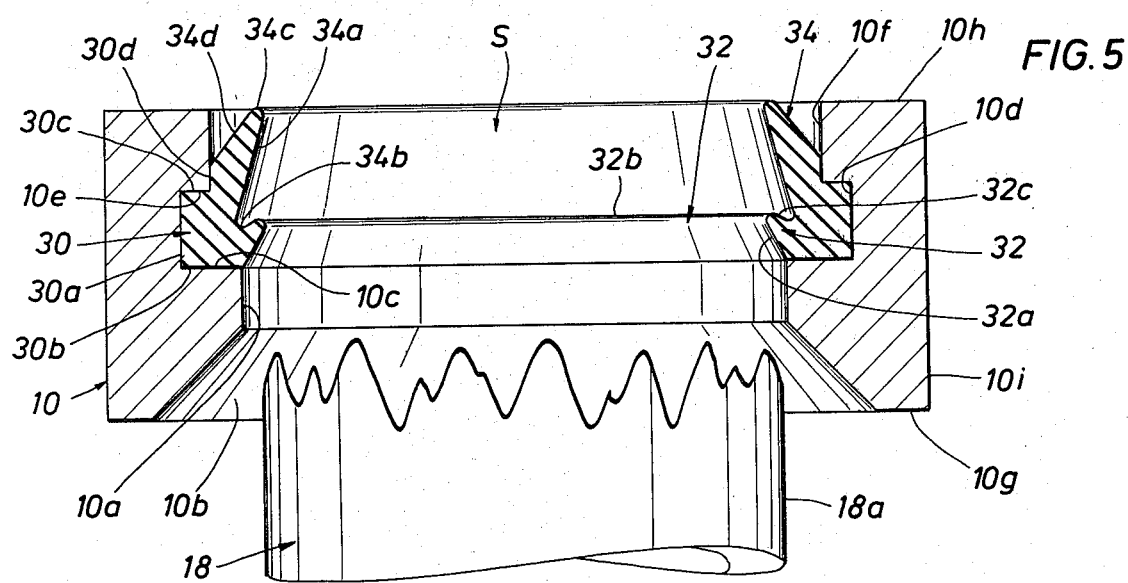
FIG. 5 is an elevational, sectional view similar to FIG. 2, showing the overshot seal of the present invention, with the overshot prior to its engagement with the tubular member.
Figure 6:
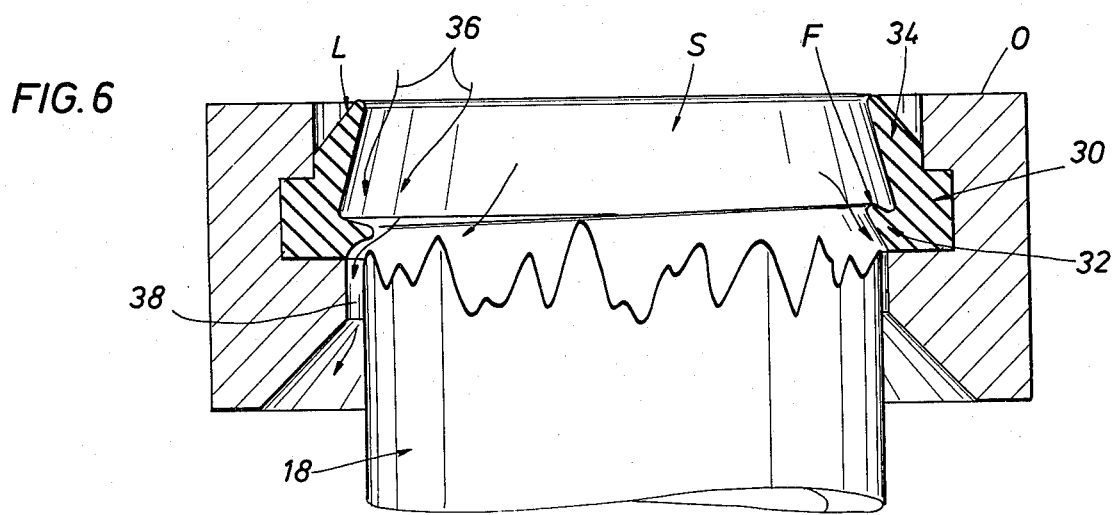
FIG. 6 is an elevational, sectional view similar to FIG. 3, showing the overshot seal of the present invention just prior to the seal's engagement with the tubular member.

The second sealing lip L includes second lip 34 which is formed having a primary conical sealing surface 34a that adjoins the second conical sealing surface 32c of the first lip 32 adjacent annular ring 34b and extends radially inwardly and upwardly in a conical fashion from the annular ring 34b, terminating at annularly curved lip surface 34c. The second lip is further formed having an upper conical surface 34d adjoining the primary conical surface 34a at the curved lip surface 34c, with the upper conical surface 34d extending radially inwardly and upwardly from the annular surface 30d of ring body 30. As best seen in FIGS. 1 and 5, the seal S of the present invention is formed such that the first sealing lip F and second sealing lip L extend radially inwardly from the bore 10a of the overshot body 10 forming a bore smaller than the outside diameter of the tubular member 18 with the second sealing lip L spaced above the first sealing lip F. Furthermore, it is preferred that the first conical sealing surface 32a and primary conical sealing surface 34a are substantially parallel to one another. Preferably the seal S is formed of Buna Nitrile such as that manufactured by B. F. Goodrich under the trademark "Hycar" or any other suitable material.

As best seen in FIG. 5, the overshot O is adapted to be placed about and over the tubular member 18. As the overshot O is lowered about the tubular member 18 (FIG. 6) the first sealing lip F, extending radially inwardly into the bore 10a of the overshot body 10, and is positioned to initially engage the tubular member 18 for reducing fluid flow therebetween the overshot O and tubular member 18. As the overshot O is further lowered onto the tubular member 18, fluid pressure acting in the direction of arrows 36 may form a pressure concentration adjacent that portion of the seal S where the annular space between the tubular member 18 and bore 10a may be the greatest as at cavity 38, which is caused because of slight non-alignment of the longitudinal axis of the tubular member 18 with the bore 10a of the overshot 10 (which is shown in exaggerated fashion for the purposes of more particularly detailing the problems incumbent with overshot seals). Because of the greater unsupported sealing area, the fluid acting in the direction of arrows 36 tend to react upon the second conical sealing surface 32c of the first lip 32 to cause a curling or warping of the first sealing lip F.

Figure 7:
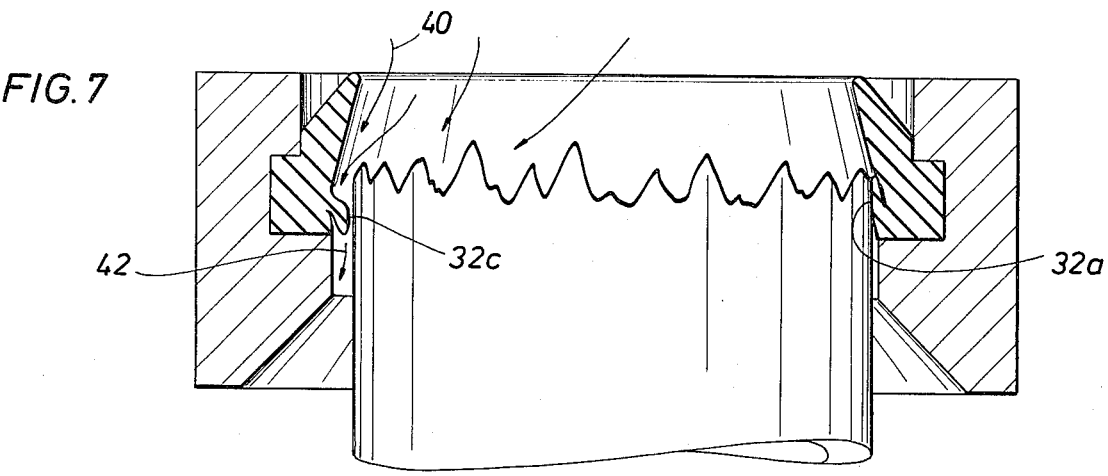
FIG. 7 is an elevational, sectional view similar to FIG. 4 of the overshot seal of the present invention, showing failure of the first sealing lip.

The first conical sealing surface 32a of the first sealing lip F is for first engaging the tubular member 18 during placement of the overshot O over the tubular member 18, as is best seen in FIG. 7, at the right-hand portion of the Figure. However, because of the continued fluid pressure buildup due in part to the somewhat axial misalignment between the overshot O and tubular member 18, fluid pressure acting in the direction of arrows 40 causes the first sealing lip F to curl or warp such that the second conical sealing surface 32c is adapted to be in position for secondarily engaging the tubular member 18 in response to the fluid pressure forcing the first conical sealing surface 32a to curl away from the tubular member 18. Leakage may occur in the vicinity of arrow 42 resulting in a non-fluid-tight relation between the overshot O and tubular member 18.

Figure 8:
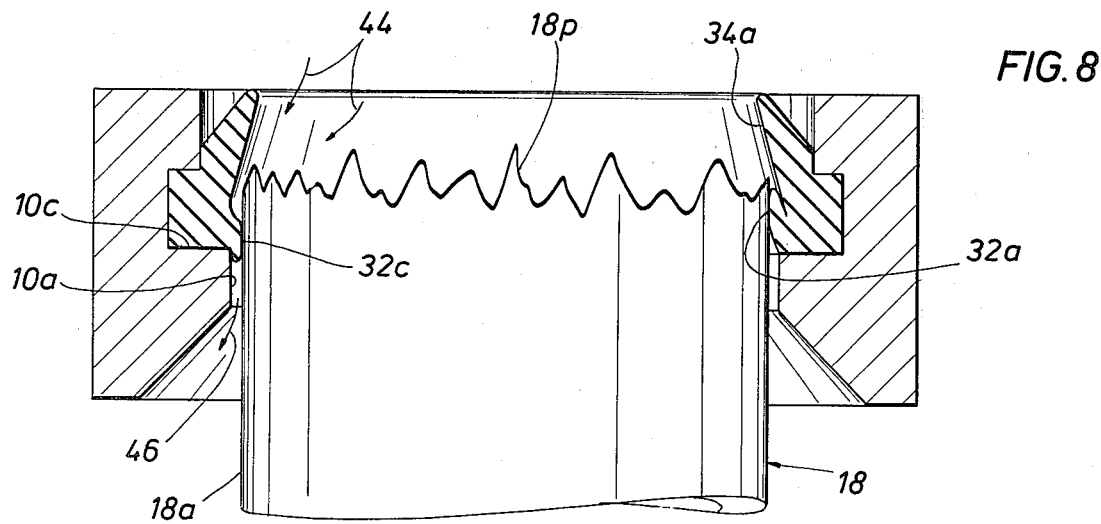
FIG. 8 is an elevational, sectional view of the overshot seal of the present invention, with the first sealing lip sealably engaging the tubular member; and, FIG. 9 is an elevational, sectional view of the overshot seal of the present invention with the first and second sealing lips thereof in sealable relation with the tubular member.
Figure 9:
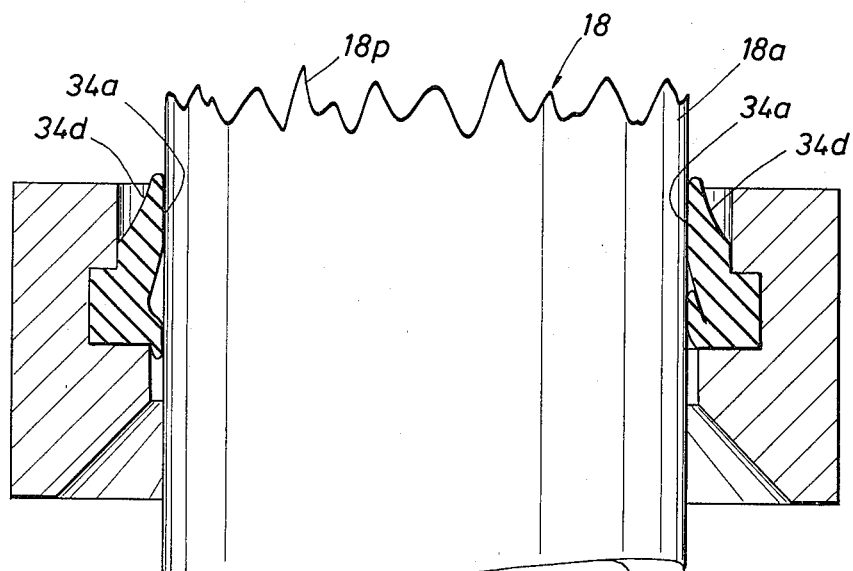

As the overshot O is lowered about the tubular member 18, the curled, second conical sealing surface 32c comes into full face engagement with the outer annular surface 18a of the tubular member 18 as is the non-curled, first conical sealing surface 32a (FIG. 8). However, the first sealing lip F in such a configuration as shown in FIG. 8 tends to axially center the tubular member 18 within the bore 10a of the overshot body 10 consequently reducing the fluid pressure buildups as indicated by arrows 44 helping to reduce potential fluid leakage represented by the arrow 46. As such, the first sealing lip F helps reduce the pressure concentrations that may develop because of fluid pressure adjacent any wrinkled, curled or damaged portion of the first sealing lip F of the seal S of the present invention.

It should be noted that a suitable thickness is provided between the bore 10a of the overshot body 10 and the outer annular surface 18a of the tubular member 18 to permit the curled portion of the first sealing lip F suitable room to be disposed between such bore 10a and tubular member 18, below the radial lip 10c of overshot body 10. Furthermore, it should be noted that when the first sealing lip F is in the position where the first conical sealing surface 32a is in engagement with the outer annular surface 18a of the tubular member 18, the second conical sealing surface 32c of the first lip 32 is in engagement with the primary conical sealing surface 34a of the second lip 34. Thus, as shown in FIG. 8, the tubular member 18 is thus substantially centered within the overshot O and increased localized fluid pressures are diminished.

Thereafter, the overshot O is further lowered over the tubular member 18 with the primary conical sealing surface 34a being in full face contact with the outer annular surface 18a of the tubular member 18. This full face contact of the primary conical sealing surface 34a of the second lip 34 results in a fluid-tight sealing relation existing between the seal S of the present invention with the overshot O and the tubular member 18. The primary conical sealing surface 34a sealably engages the outer annular surface 18a of the tubular member 18 to thwart fluid flow therebetween, even in the event that the second conical sealing surface 32c is not in sealable engagement with the tubular member 18. The upper conical surface 34d is formed such that when the primary conical sealing surface 34a engages the outer annular surface 18a of the tubular member 18, the upper conical surface reacts to fluid pressure such that the second sealing lip L is further forced into engagement with the tubular member 18 because of the fluid pressure acting thereon, to ensure a positive, sealable relation therebetween the overshot O and tubular member 18. As such, the upper conical surface 34d utilizes the fluid pressure for a sealable advantage for ensuring positive sealing between the primary conical sealing surface 34a and the tubular member 18.

Thus, the seal S of the present invention contemplates a first sealing lip F that is adapted to make initial engagement with the tubular member 18 for reducing fluid flow therebetween the tubular member 18 in the overshot O, with the first sealing lip being expendable, subject to damage, yet not destroying the intended end result of the seal S of the present invention of providing a fluid-tight relation between the tubular member 18 and overshot O. Further lowering of the overshot O about the tubular member 18 results in the second sealing lip L, which extends radially inwardly into the bore 10a of the overshot body 10 from the seal ring body B and spaced above the first sealing lip F, establishing a fluid-tight relation between the second sealing lip L and the tubular member 18 for preventing fluid flow therebetween.

Thus, the seal S of the present invention provides a new and improved seal for an overshot O for ensuring a fluid-tight relation between the overshot O and tubular member 18 even though the tubular member 18 may be misaligned within the bore 10a of the overshot body 10, with resultant damage to the first sealing lip F, yet having a second sealing lip S to ensure the integrity of the sealable relation between the tubular member 18 and overshot O.

The foregoing disclosure and description of the invention are illustrative and explanatory thereof, and various changes in the size, shape and materials, as well as in the details of the illustrated construction, may be made without departing from the spirit of the invention.

We claim:

1. A seal mounted with an overshot for sealably engaging a tubular member to prevent fluid migration therebetween during overshot operations, comprising:
   an annular seal ring body adapted to be mounted with the overshot;
   said seal ring body formed having a first sealing lip extending radially inwardly into the bore of the overshot from said seal ring body for initial engagement with the tubular member to sealably reduce fluid flow therebetween;
   said seal ring body formed having a second sealing lip extending radially inwardly into the bore of the overshot from said seal ring body;
   said second sealing lip is formed having a continuous, annular primary conical sealing surface for sealably engaging the tubular member; and,
   said second sealing lip spaced above said first sealing lip for establishing a fluid-tight relation between said second sealing lip and the tubular member for preventing fluid flow therebetween.

2. The seal of claim 1, wherein:
   said first sealing lip is expendable.

3. The seal of claim 1, wherein:
   said seal ring body is formed having a base end surface, an annular outer surface, and a top end surface;
   said base and top end surfaces being substantially parallel to one another; and,
   said annular outer surface being substantially perpendicular to said base and top end surfaces.

4. The seal of claim 1, wherein:
   said seal ring body is formed having a base end surface;
   said first sealing lip includes a first conical sealing surface and a second conical sealing surface, said first conical sealing surface extending radially inwardly and upwardly from said base end surface, said first conical sealing surface adjoining said second conical sealing surface at a radially innermost portion at an annular tip surface;

said first conical sealing surface for first engaging the tubular member during placement of the overshot over the tubular member; and, said second conical sealing surface for secondarily engaging the tubular member in response to fluid pressure forcing said first conical sealing surface to curl away from the tubular member.

5. The seal of claim 4, wherein:

said primary conical sealing surface of said second sealing lip adjoins said second conical sealing surface of said first sealing lip, said primary conical sealing surface extending radially inwardly and upwardly from said second conical sealing surface, said primary conical sealing surface terminating at an annularly curved lip surface; and said primary conical sealing surface is for sealably engaging the tubular member to thwart fluid flow therebetween, even in the event that said second conical sealing surface is not in sealable engagement with the tubular member.

6. The seal of claim 5, wherein:

said second sealing lip is formed having an upper conical surface adjoining said primary conical sealing surface at said curved lip surface, said upper conical surface resisting fluid pressure for insuring positive sealing between said primary conical sealing surface and the tubular member.

7. The seal of claim 1, wherein:

said first and second sealing lips extend radially inwardly to form a bore within the overshot of a diameter less than the outside diameter of the tubular member.

8. A method of sealing an overshot about a tubular member to prevent fluid migration therebetween during overshot operations, comprising the steps of:

mounting an annular seal ring body within the overshot, with the seal ring body having first and second sealing lips extending radially inwardly onto the bore of the overshot from the seal ring body;

placing the overshot over the tubular member;

positioning the overshot onto the tubular member to permit the first sealing lip to engage the tubular member to sealably reduce fluid flow therebetween; and, lowering the overshot onto the tubular member to permit a continuous, annular primary conical sealing surface of the second sealing lip to engage the tubular member for establishing a fluid-tight relation between the second sealing lip and the tubular member for preventing fluid flow therebetween.

9. The method of claim 8, wherein:

said positioning permits a first conical sealing surface of the first sealing lip to sealably engage the tubular member and a second conical sealing surface of the first sealing lip to sealably engage the tubular member in response to fluid pressure forcing the first conical sealing surface to curl away from the tubular member.

10. The method of claim 9, wherein:

said lowering includes permitting a primary sealing surface of the second sealing lip to sealably engage the tubular member to thwart fluid flow therebetween, even in the event that the first sealing lip is not in a sealable relation with the tubular member.

* * * * *